United States Patent [19]

Lebrun

[11] 4,281,383

[45] Jul. 28, 1981

[54] PROCESS AND SYSTEM FOR THE RAPID DETECTION OF A WIND GRADIENT

[75] Inventor: Jean-Louis Lebrun, Antony, France

[73] Assignee: Societe Francaise d'Equipements pour la Navigatior Aerienne (S.F.E.N.A.), France

[21] Appl. No.: 79,517

[22] Filed: Sep. 27, 1979

Related U.S. Application Data

[63] Continuation of Ser. No. 750,245, Dec. 13, 1976, abandoned.

[51] Int. Cl.³ .......................... G06G 7/70; G05D 1/12
[52] U.S. Cl. .................................. 364/428; 244/181; 340/27 R
[58] Field of Search ............. 364/427, 428; 340/27 R, 340/27 SS; 73/178 R, 178 T; 244/181-186

[56] References Cited

U.S. PATENT DOCUMENTS

| | | | |
|---|---|---|---|
| 3,149,491 | 9/1964 | Sissenwine et al. | 73/178 R |
| 3,265,333 | 8/1966 | Montooth | 364/428 |
| 3,618,002 | 11/1971 | Stinson | 244/183 |
| 3,686,626 | 8/1972 | Bateman et al. | 364/428 |
| 3,814,912 | 6/1974 | Manke et al. | 364/428 |
| 4,021,010 | 5/1977 | Bliss | 364/428 |
| 4,106,731 | 8/1978 | Bliss | 364/428 |

Primary Examiner—Errol A. Krass
Attorney, Agent, or Firm—Scully, Scott, Murphy & Presser

[57] ABSTRACT

A process and system for the rapid detection of a wind gradient or change for an aircraft. Such a system provides for, on the one hand, the rapid detection of important or significant wind gradients or changes which can occur during the final phase of approach preceding the landing of the aircraft and, on the other hand, to inform the pilot or the automatic flight control system of the existence of this wind gradient sufficiently early to permit necessary corrective action to be taken.

10 Claims, 3 Drawing Figures

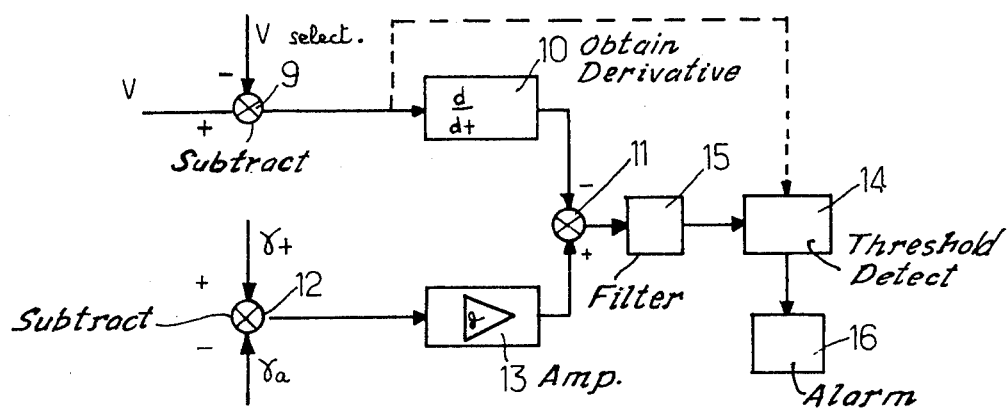
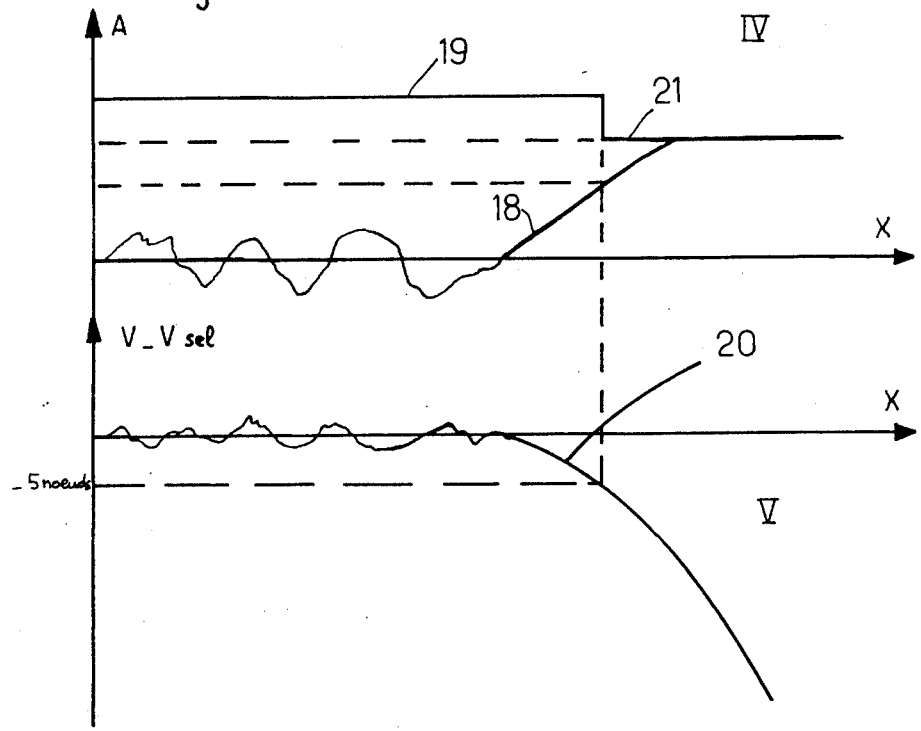

PROCESS AND SYSTEM FOR THE RAPID DETECTION OF A WIND GRADIENT

This is a continuation of application Ser. No. 750,245, filed Dec. 13, 1976 and now abandoned.

FIELD OF THE INVENTION

The present invention relates to a process and system for the rapid detection of a wind gradient or change for an aircraft.

More particularly, such a system has as its object, on the one hand, the rapid detection of important or significant wind gradients or changes which can occur during the final phase of approach preceding the landing of the aircraft and, on the other hand, to inform the pilot or the automatic flight control system of the existence of this wind gradient sufficiently early to permit necessary corrective action to be taken.

In general, under the term wind gradient there is to be understood every important variation in the wind vector which is produced along the flight trajectory of the aircraft. It is known that when these wind gradients are encountered during of the approach of an aircraft, and when they occur through a rough or sudden change of direction, either of the head or tail wind, these wind gradients are the cause of many accidents.

This important risk of accident is due to the fact that this type of wind gradient entails a loss in important aerodynamic speed, and consequently produces a deviation from the trajectory in a downward direction and an increase in the speed relative to the ground.

In order to counteract the effects of these wind gradients or changes, the only recourse open to the pilot is to modify the aircraft pitch attitude so as to reestablish the trajectory and to force the engines to operate at their maximum performance to thereby counter the loss in the aircraft's aerodynamic speed.

To be effective, this action by the pilot must be initiated at the very beginning of the development of the wind gradient, this being very difficult to carry out when only the customary flight instruments are available. Generally, the attention of the pilot is only drawn when a relatively important or significant divergence of the speed or from the trajectory has already been produced, and after detection of this divergence he needs an additional period time before manipulating the throttles and/or attitude controls. It is obvious that for reasons of the rapidity and abruptness of certain wind gradients, the slightest loss of time may have the gravest consequences as viewed from the point of safety.

SUMMARY OF THE INVENTION

Accordingly, the primary object of the invention is to reduce these above-mentioned accident risks. For that purpose, the invention contemplates a process and a system which will make it possible to forewarn the pilot of the presence of a wind gradient or change from its very first symptoms or indication, and to unambiguously notify the pilot that he must immediately take the necessary steps to counteract the effects of this wind change or gradient.

Pursuant to a characteristic feature of the invention, the above-mentioned process for the rapid detection of wind change or gradient utilizes the following properties:

the aerodynamic incline or flight path angle $\gamma a$ which is equal to the algebraic difference between the pitch attitude $\theta$ and the angle of attack $\alpha$;

the total flight path angle $\gamma t$ which is calculated by means of the angle of attack $\alpha$ and two accelerometers whose sensing axes are oriented, respectively, parallel to the rolling axis (detection $J_x$) and parallel to the pitch axis (detection $J_z$) because:

$$\gamma t = J_x - J_z \alpha,$$

the difference between the selected reference speed during the approach (Vsel) and the air speed V.

In this connection, it is to be noted that any system which is already a component of the aircraft, can be advantageously utilized to furnish values utilized in calculating $\gamma_a$ and $\gamma_t$, but it should be stressed that $\gamma_t$ is a new variable not available in prior art systems.

The problem thus posed is to find a simple relationship which permits the attainment of rapid and significant detection by means of these three variables $\gamma t$, $\gamma a$ and $(V - V_{sel})$. It is known that under normal flight conditions and with the assumption that skidding is zero and that the wings are horizontal, the total slope $\gamma t$ is expressed by the formula $$\gamma t = (1/g)(dV_s/dt) + \gamma a$$

in which g is the acceleration due to weight (gravity), and $V_s$ the ground speed of the aircraft. From this equation, there is derived:

$$g(\gamma t - \gamma a) = dV_s/dt$$

The principle of the invention is based on comparing the derivative of the ground speed $V_s$ with the derivative of the air speed V. In the case of a wind shear or gradient, and at the first appearance of this phenomenon, these two derivatives have opposite signs.

From the foregoing, the following formula is derived:

$$(\gamma a - \gamma t) g - \frac{s(V - V_{sel})}{1 + 0.2 s} = A$$

in which the symbol "s" stands for the Laplace operator, and in which "A" is a reasonable constant value or zero under normal flight, and which increases in the event of a wind gradient becoming dangerous (wind passing from the front section to the rear section).

Consequently, the process according to the invention consists of detecting changes in the value of "A" and in delivering a warning signal, for instance a visual or audio signal, or a signal to the automatic controls as soon as this value rises above a predetermined level or threshold.

According to another feature of the invention, the value of the threshold can vary as a function of the differences in the speed $(V - V_{sel})$, these variations may be effected in level flight.

According to another method of the invention, the system of the detection of a wind gradient comprises, on one hand, a circuit comprising a subtractor which effectuates the difference $(V - V_{sel})$, a derivator which effectuates the derivative of that difference; on the other hand, a circuit comprising a subtractor effectuating the difference $\gamma t - \gamma a$, and an amplifier whose "gain" corresponds to the value "g", in order to produce the product g ($\gamma t - \gamma a$), and finally a circuit comprising a subtractor connected to the two preceding circuits which will provide the difference:

$$\left[ \frac{d}{dt}(V - V_{sel}) \right] - [g(\gamma t - \gamma a)]$$

as well as a filter element for eliminating disturbances, for instance, due to turbulences, and finally a level detector for controlling an alarm device.

BRIEF DESCRIPTION OF THE DRAWINGS

An exemplary embodiment of the invention will now be described hereinbelow, with reference to the accompanying drawings; in which.

Figure 1:
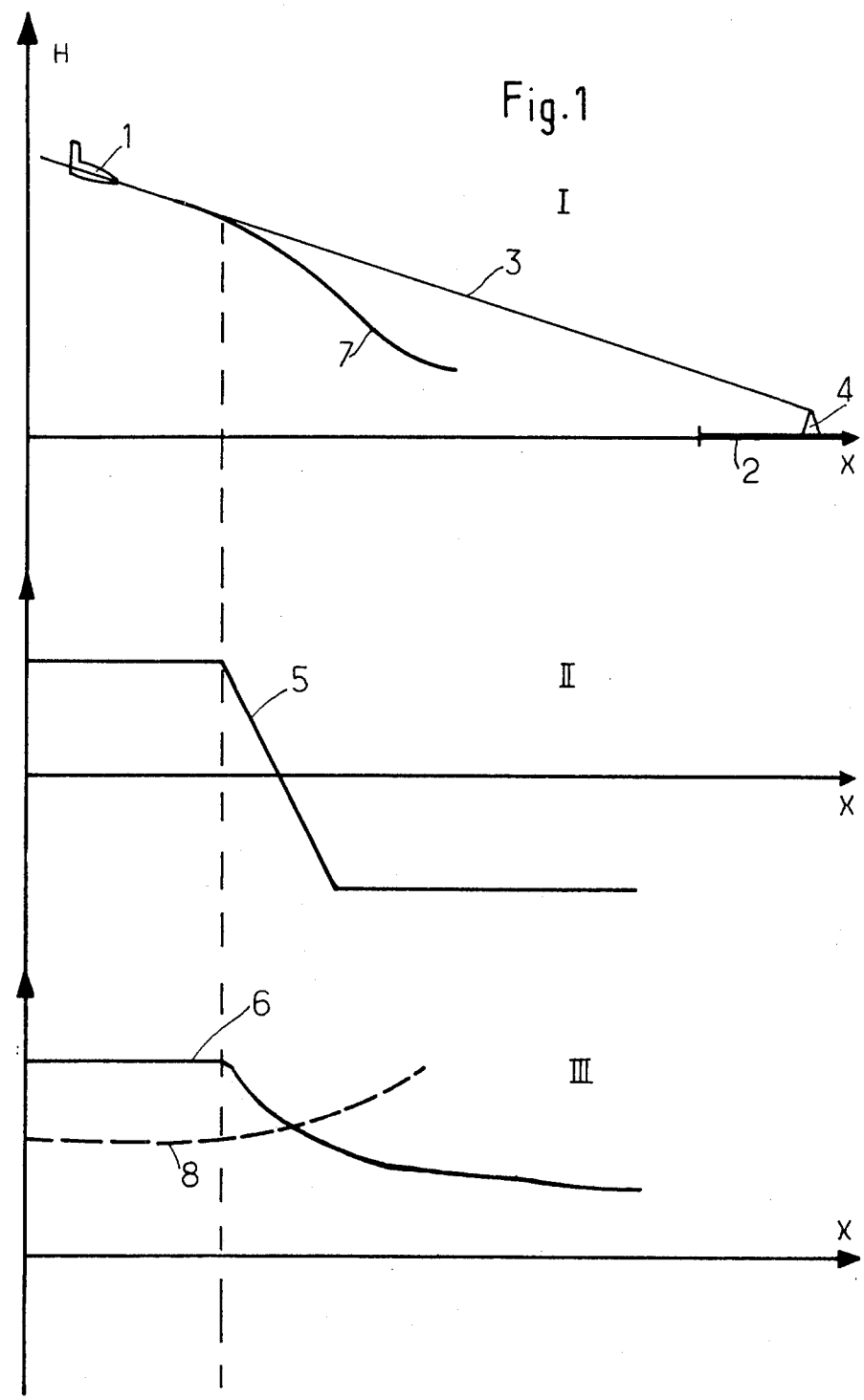
FIG. 1 is a graphical representation illustrating the effects of a wind gradient upon an airplane; and showing.

the trajectory, in a vertical plane, of an airplane at the time of a landing approach (Graph I);

the curve of the wind intensity along the trajectory of the airplane, accounting for the direction thereof (front/rear) relative to the airplane during a period when a wind gradient is produced (Graph II), and the curve of the aerodynamic speed along the trajectory (Graph III);

FIG. 2 shows a schematic circuit diagram of a detection system for wind gradients constructed according to the invention; and FIG. 3 shows a graph representing the variation of the threshold at the moment when there is produced a wind gradient (Graph IV), and the change in the difference ($V - V_{sel}$) along the trajectory (Graph V).

DETAILED DESCRIPTION OF THE INVENTION

Having reference to FIG. 1, during the course of the approach procedure in sight of the landing strip, the airplane 1 (Graph I) begins its descent and is guided to that effect in an inclined plane (guidance in the descent of the aircraft), the curve of which is identified by the reference numeral 3, through a beacon 4 designated "glide path". In other words, in the course of a normal trajectory, the airplane must follow the trajectory represented by curve or line 3.

In the case of a wind change or gradient taking place in which the wind passes from the front to the rear relative to the airplane (Curve 5, Graph II), the aerodynamic speed of the airplane (Curve 6, Graph III) decreases drastically while, concurrently, the trajectory of the airplane drops (Curve 7, Graph I) below the inclined plane of curve line 3. It is to be noted that, in comparison, the speed of the airplane relative to the ground (Curve 8, Graph III) displays a tendency to increase.

It is clear that the drop-off in the trajectory of the airplane which is caused by the wind change can constitute a grave risk of accident if the pilot does not reestablish immediately, at the very beginning of the occurence of wind change or gradient, a trajectory with a lesser incline towards the ground, by activating the attitude controls and by throttling the engines of the aircraft towards maximum performance levels in order to minimize the deviation in the velocity and/or flight path angle of the aircraft.

As shown in FIG. 2, the system which will facilitate the pilot to be warned of the occurrence of a wind change comprises essentially a subtractor 9 which receives a signal at its inputs, respectively positive or negative, and proportional to the anemometric or air speed V, and a signal corresponding to a selected speed $V_{sel}$, set by the pilot (the output of this subtractor, in certain cases, may be already present in the aircraft, for example, in the anemometer, and may thus be used directly). The subtractor 9 is connected to a derivator 10 which provides the derivative with respect to time of the difference ($V - V_{sel}$). The result of this difference is transmitted to the negative input of a subtractor 11.

This subtractor receives a signal representing a magnitude g ($\gamma t - \gamma a$) at its positive input, which is derived by means of a subtractor 12 receiving, at its positive input, a signal representative of $\gamma t$ and on its negative inlet a signal representative of $\gamma a$; the result of this difference then being amplified through the intermediary of an amplifier 13 having a gain (g).

It is of note that the signals representative of $\gamma a$ and $\gamma t$ may be supplied by means of a variometer at the total energy furnished the aircraft, as described in the French Patent Application No. 75 21137 filed on July 4, 1975 in the name of the applicant, corresponding generally to U.S. patent application Ser. No. 703,006, filed July 6, 1976, now U.S. Pat. No. 4,071,893.

The subtractor 11 is connected to a threshold detector 14 through the interposition of a filter 15. This detector 14 transmits a repetitive or flashing command signal to an alarm device 16, for instance, either visual or audio (or may be directly connected with the automatic flight control system).

The threshold of the detector 14 may be a fixed value. However, in order to increase the rapidity with which the wind change can be detected; this threshold can be made variable as a function of the difference ($V - V_{sel}$) or, possibly, as a function of the angle of attack $\gamma$ of the airplane relative to a fixed value $\gamma_o$.

In order to vary the threshold as a function of $V - V_{sel}$, it is, therefore, possible to provide for a connection 17 (represented by the phantom line in FIG. 2) which directly connects the output of the comparator 9 to the detector 14, wherein this connection exerts an effect over the level of the threshold.

The variation in the threshold may be of a progressive type or in level steps.

FIG. 3 shows the operation of a threshold detector in level steps. As seen in Graph IV of that FIG., which represents the curve 18 of the magnitude A, present at the input of the detector 14 along the trajectory, the threshold curve 19 and its variation are at the instant when there occurs a wind gradient or change.

With reference to Graph IV, this wind change induces a drastic decrease in the value ($V - V_{sel}$) plotted on Curve 20. As soon as the value ($V - V_{sel}$) decreases by a predetermined amount, for example, $-5$ knots, the threshold value of the detector 14 is reduced to a level 21. The alarm device 16 is then activated when the value "A" reaches the value of the threshold of the detector 14, present at that instant. In the illustrated example, the value "A" reaches the threshold after a decrease of the same through the intermediary of ($V - V_{sel}$).

What is claimed is:

1. A process for rapidly detecting wind shear taking into account vertical and horizontal wind components, without requiring a direct measure of ground speed, comprising:

a. determining the rate of change of air speed of the aircraft;
b. determining the actual flight path angle of the aircraft;
c. determining the acceleration of the aircraft along its velocity vector;
d. utilizing said actual flight path angle and acceleration of the aircraft along its velocity vector to determine a total flight path angle which is directly related to the rate of change of total energy of the aircraft, the total energy of the aircraft being the sum of the kinetic and potential energy components of the aircraft;
e. utilizing said rate of change of air speed, said actual flight path angle and said total flight path angle to provide a display to the pilot which is an indication of the wind shear affecting the aircraft; and
f. utilizing a measure of wind shear severity to provide an anticipation to the pilot of a critical angle of attack, including the steps of generating a threshold value of wind shear severity, and indicating to the pilot when the measure of wind shear severity exceeds said threshold value.

2. A process as claimed in claim 1, including the step of varying said threshold value in dependence upon said determined rate of change of air speed.

3. A process as claimed in claim 1, including the step of varying said threshold value as a function of the diversion of the angle of attack of the aircraft from a fixed value therefor.

4. A process as claimed in claim 3, including varying said threshold value as a continuous function of the angle of attack of the aircraft.

5. A process as claimed in claim 1, including the step of utilizing said indication of the wind shear affecting the aircraft to automatically control the operation thereof.

6. A system for rapidly detecting wind shear taking into account vertical and horizontal wind components, without requiring a direct measure of ground speed, comprising:
a. means for determining the rate of change of air speed of the aircraft;
b. means for determining the actual flight path angle of the aircraft;
c. means for determining the acceleration of the aircraft along its velocity vector;
d. means, utilizing said actual flight path angle and acceleration of the aircraft along its velocity vector, to determine a total flight path angle which is directly related to the rate of change of total energy of the aircraft, the total energy of the aircraft being the sum of the kinetic and potential energy components of the aircraft;
e. means, utilizing said rate of change of air speed, said actual flight path angle and said total flight path angle, for providing a display to the pilot which is an indication of the wind shear affecting the aircraft; and
f. means, utilizing a measure of wind shear severity, for providing an anticipation to the pilot of a critical angle of attack, including means for generating a threshold value of wind shear severity, and means for indicating to the pilot when the measure of wind shear severity exceeds said threshold value.

7. A system as claimed in claim 6, including means for varying said threshold value in dependence upon said determined rate of change of air speed.

8. A system as claimed in claim 6, including means for varying said threshold value as a function of the diversion of the angle of attack of the aircraft from a fixed value therefor.

9. A system as claimed in claim 8, including means for varying said threshold value as a continuous function of the angle of attack of the aircraft.

10. A system as claimed in claim 6, including means for utilizing said indication of the wind shear affecting the aircraft to automatically control the operation thereof.

* * * * *